(12) United States Patent
Krampe

(10) Patent No.: US 9,185,539 B2
(45) Date of Patent: Nov. 10, 2015

(54) APPARATUS AND METHOD OF ESTABLISHING CREDIT ON A CASH REGISTER OR PRINTER

(76) Inventor: Richard L. Krampe, Winter Park, FL (US)

(*) Notice: Subject to any disclaimer, the term of this patent is extended or adjusted under 35 U.S.C. 154(b) by 1082 days.

(21) Appl. No.: 12/802,546

(22) Filed: Jun. 10, 2010

(65) Prior Publication Data

US 2011/0153442 A1     Jun. 23, 2011

Related U.S. Application Data

(63) Continuation-in-part of application No. 12/653,741, filed on Dec. 18, 2009.

(51) Int. Cl.
| | |
|---|---|
| H04W 4/24 | (2009.01) |
| G06Q 20/32 | (2012.01) |
| G06Q 20/42 | (2012.01) |
| G06Q 20/20 | (2012.01) |

(52) U.S. Cl.
CPC .............. *H04W 4/24* (2013.01); *G06Q 20/20* (2013.01); *G06Q 20/202* (2013.01); *G06Q 20/32* (2013.01); *G06Q 20/42* (2013.01); *G06Q 20/425* (2013.01); *G06Q 20/204* (2013.01)

(58) Field of Classification Search
None
See application file for complete search history.

(56) References Cited

U.S. PATENT DOCUMENTS

| | | | |
|---|---|---|---|
| 5,991,749 A | 11/1999 | Morrill, Jr. | |
| 6,038,491 A | 3/2000 | McGarry et al. | |
| 6,584,309 B1 * | 6/2003 | Whigham | 455/414.1 |
| 7,039,389 B2 | 5/2006 | Johnson, Jr. | |
| 7,072,854 B2 | 7/2006 | Loeser | |
| 7,127,236 B2 | 10/2006 | Khan et al. | |
| 7,164,884 B2 | 1/2007 | Defosse et al. | |
| 7,213,742 B1 | 5/2007 | Birch et al. | |
| 7,376,583 B1 * | 5/2008 | Rolf | 705/17 |
| 7,575,377 B2 | 8/2009 | Fick et al. | |
| 7,577,616 B2 | 8/2009 | Zhu | |
| 2003/0023509 A1 | 1/2003 | Rammig | |
| 2004/0030601 A1 | 2/2004 | Pond et al. | |

* cited by examiner

*Primary Examiner* — Ryan Zeender
*Assistant Examiner* — Denisse Ortiz Roman
(74) *Attorney, Agent, or Firm* — William M. Hobby, III

(57) ABSTRACT

A method and system is provided for establishing credit on a cash register or printer. A currency amount is established on a cash register or printer in order to pay for a product or service using a cellular telephone, or other personal wireless communication device. The personal wireless communication device activates an applet, which may be downloaded at the site, to establish a link with a vending universal wireless interface (VUWI) coupled to the cash register or printer's microprocessor controller to establish a link with a remote server for authorizing credit for the payment of the transaction to complete a purchase by a consumer.

17 Claims, 4 Drawing Sheets

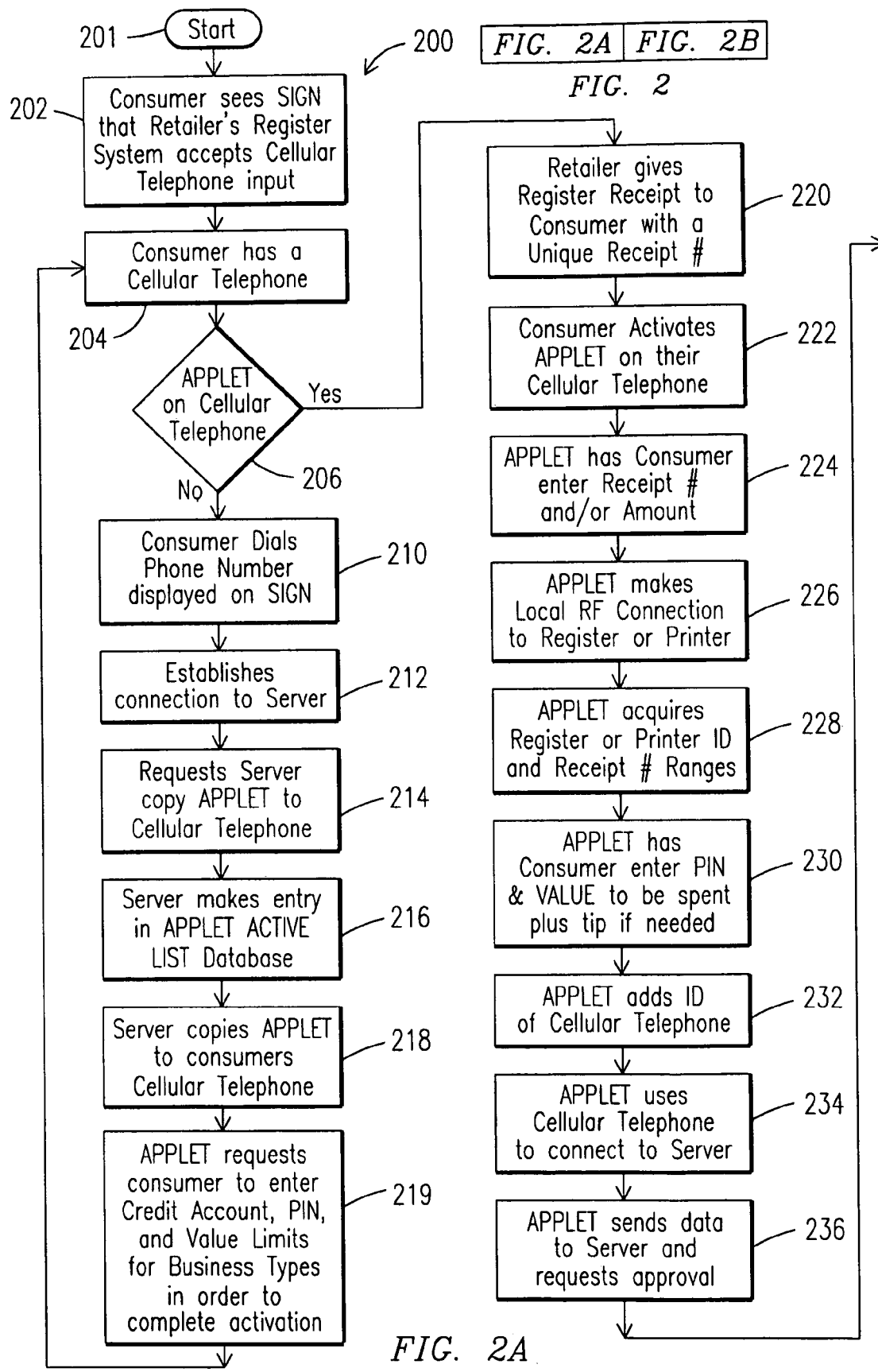

APPARATUS AND METHOD OF ESTABLISHING CREDIT ON A CASH REGISTER OR PRINTER

This application is continuation-in-part of U.S. patent application Ser. No. 12/653,741, filed Dec. 18, 2009 for Method of Establishing Credit on a Vending Machine.

FIELD OF THE INVENTION

The present invention relates to establishing credit on a Cash Register or Cash Register System or by creating a credit/debit card receipt on a printer. The cash register can establish a currency amount on a Cash Register or Cash Register System while the printer can create a credit/debit card receipt on a printer in order to pay for a product or services using a cellular telephone, or other personal wireless communication device, using an applet placed on the personal wireless communication device that can communicate with a vending universal wireless interface (VUWI) device. The VUWI has its Serial or USB port connected to the Serial or USB port of a Cash Register or Cash Register System or printer in order to interface with the microprocessor or with software being executed by the Cash Register or printer microprocessor controller.

BACKGROUND OF THE INVENTION

Cash Registers and Cash Register Systems have become commonplace in retail establishments which offer consumers a variety of products and services which the consumer must pay for using either currency or credit. The Cash Registers and Cash Register Systems become the temporary repository of whatever coins, paper currency, account credit vouchers, credit cards receipts, and debit card receipts used by the consumer to pay for the products or services offered by a retailer.

Cash Register and Cash Register Systems, hereinafter referred to as Registers or Cash Registers, that accept credit cards and debit cards generally require an online or dial-up connection from the Register to the credit or debit card issuer, merchant bank or to a gateway service offering credit or debit card processing services. Any of these approaches can be used to verify the availability of funds or credit and thereby authorize the completion of the transaction at the Register. The online or dial-up connection to the Register must be secure and must generally be a dedicated connection that is available on demand to insure satisfactory transactions in terms of speed and reliability.

Cash Registers that accept credit cards often require the customer to surrender their credit card to an attendant, waiter, waitress, bartender, or other retail sales person in order to have the card swiped into the business' register system. This often puts the consumer's credit card out of direct visual contact and presents an opportunity for fraudulent use or misappropriation of the consumer's credit card or the information contained thereon.

A personal wireless communication device includes not only cell phones but also a personal digital assistant (PDA), IPOD, IPHONE, Smartphone, laptop computer or other similar personal wireless communication device, which can be used to communicate with a remote server.

In the past there have been attempts to vend or sell products or services without using cash but these have been primarily concerned with the use of credit cards in which the vending machine or cash register has a connection to the world wide internet or some other communication to approve the use of the credit card. One prior system as disclosed in the Whigham U.S. Pat. No. 6,584,309 is for a method of authorizing the purchase of a product from an automatic vending machine by means of a consumer's cellular telephone. In this system the consumer uses a cellular phone to request a product from a vending machine by dialing a specified telephone number to connect the consumer's phone to a server operated by a billing agency. The server identifies the product and creates a request for purchase of the product and a transaction record and sends a "vend code" to the consumer's cell phone, which allows the consumer to purchase the product.

Other systems using cellular telephone or wireless communication devices may be seen in the Johnson, Jr. U.S. Pat. No. 7,039,389, for a cellular telephone-based retail transaction system for dispensing fuel and in the Carapelli U.S. Pat. No. 7,574,377, for a vending system for vending to purchasers having cellular phones or the like enabled to a wireless internet connection for communication over the internet. The Zhu U.S. Pat. No. 7,577,616, provides for a method for secure authentication or electrical payment utilizing a random ID verification method through a mobile communication tool. U.S. Pat. No. 5,991,749, teaches a wireless telephony for collecting tolls, conducting financial transactions, and authorizing other activities. U.S. Pat. No. 7,164,884 uses a wireless interface module to interface with a vending machine control system to allow communication between vending machines and a wireless network by coupling a transceiver to the wireless interface module. The Khan et al U.S. Pat. No. 7,127,236 is for a micropayment financial transaction process utilizing wireless network processing while the McGarry et al. U.S. Pat. No. 6,038,491, is for a monitoring and reporting system using a cellular carrier.

Other prior U.S. patents include the Morrill, Jr. U.S. Pat. No. 5,991,749 for a wireless telephony for collecting tolls, conducting financial transactions, and authorizing other activities and the Birch et al. U.S. Pat. No. 7,213,742 for a fuel dispensing system having a plurality of fuel dispensers capable of conducting a fueling transaction using a customer's cellular telephone. Also, the Loeser U.S. Pat. No. 7,072,854 for a Payment System by Means of a Mobile Device and the Pond et al. Patent Application Publication U.S. 2004/0030601 for Ele4ctronic Payment Methods for a Mobile Device and the Ramming U.S. Patent Publication Number U.S. 2003/0023509 for Method For Selecting and Paying for Items with a Mobile Terminal and in U.S. Patent Publication No. U.S. 2008/0035724 to Vawter for Transaction Information Mining.

My prior U.S. patent application Ser. No. 12/653,741 is for a Method of Establishing Credit on a Vending Device and establishes a currency amount on a vending machine in order to obtain a product or service using a cellular telephone or personal wireless communication device, using an applet placed on the personal wireless communication device that can communicate with a vending universal wireless device placed on the vending machine.

The present invention relates to a Vending Universal Wireless Interface (VUWI); which includes Bluetooth, Wi-Fi, Wireless LAN or other RF Transceiver with outputs that can be connected to the USB or Serial Port of a cash register or cash register system or printer microprocessor controller in order to interface with the microprocessor or with software being executed by the cash register or printer's microprocessor. The VUWI contains a power supply, a microprocessor, an RF Transceiver using either Bluetooth, Wi-Fi, Wireless LAN or other RF Transceiver protocols, as well as physical connector outputs. The VUWI can be connected to a Register or printer's microprocessor controller in order to interface with the microprocessor or with software being executed by the cash register or printer's microprocessor to execute a credit transaction on the register or to create a printed credit/debit card receipt on the printer.

SUMMARY OF THE INVENTION

A method of executing a transaction on a Cash Register or Cash Register System or printer, by a consumer using a cellular phone or other wireless personal communication device by the consumer activating an applet on the cellular telephone to establish a wireless link with a cash register or a printer having a vending universal wireless interface device attached thereto. A wireless link is established between the wireless personal communication device and a computer server for transmitting a request from the wireless communication device to the computer server for approval of a transaction for use on the cash register or printer. The computer server determines the credit availability of the transmitted request and generates a transaction record from the transmitted request and transmits a response from the computer server to the personal communication device authorizing a predetermined transaction for use on the cash register or printer upon credit authorization of the transaction. The personal communication device then communicates the transaction approval to the vending universal wireless interface (VUWI) which in turn communicates the approved amount to the cash register to pay for the product or services or to the printer to print a credit/debit card receipt for the product or service.

A system for establishing credit on a cash register or for printing a credit/debit card receipt for use on a cash register by a consumer using the consumer's cellular phone or wireless communication device uses a vending universal wireless interface coupled to the cash register or printer microprocessor controller. The wireless communication device has a local transceiver and an applet thereon for communication between the personal wireless communication device and the register or printer vending universal wireless interface. A remote computer server is linkable with the personal wireless communication device for receiving requests from the personal communication device for approval of a transaction on the cash register or receipt amount to be printed by the printer. The remote server is adapted to respond to approval for a register purchase or printer's receipt request and for instituting the creation of a transaction record from the request.

An apparatus and method is provided for establishing credit on a cash register, by printing credit/debit card receipt, by means of a software Applet running on a consumer's cellular telephone and an vending universal wireless interface (VUWI) attached to the cash register or to the printer. If the consumer does not have the Applet, they can request a copy by dialing a specified telephone number which connects the consumer's cellular telephone to a server which is able to download the Applet to the consumer's cellular telephone. If the cash register or printer does not have the VUWI attached, then communication between the consumer's cellular telephone and the cash register is not possible until the cash register or printer has the VUWI attached to the USB or serial port thereof.

If the cash register or printer has the VUWI and if the consumer has the Applet and wishes to obtain approval of a transaction on a cash register or print a credit/debit card receipt, the consumer activates the Applet on their cellular telephone. The Applet then requests the consumer to enter on the keyboard of the cellular telephone the cash register receipt number or the receipt number and the amount that the consumer wishes to pay. The Applet establishes contact with the cash register or printer through the VUWI in order to secure its identity and a copy of the cash register receipt for products or services that is to be paid or the printer owner's merchant account ID and receipt number ranges. The Applet then requests that the consumer enter on the keyboard of the cellular telephone any tip amount, if appropriate, that is to be added to the cash register receipt or receipt amount and then the total amount to be spent as well as a personal identification number (PIN), which the Applet forwards to a server for approval. The server recognizes the request for approval and verifies that the requesting Applet has the correct cellular telephone identification and the correct consumer PIN as well as a correct Register identity or printer identity. The server then checks the consumer's credit account for available funds. The server then creates a transaction record for its history log and communicates an approval or denial code to the Applet on the consumer's cellular telephone. The Applet stores a receipt on the consumer's cellular telephone and displays the approval or denial status of the request on the consumer's cellular telephone's display screen. The Applet communicates the transaction approval or denial to the cash register or printer through the VUWI. If the communication is with a printer, the printer prints a credit/debit card receipt and the consumer signs the receipt. If the communication is with a cash register, the consumer then gets the merchant or retailer to print a new copy of the cash register receipt and completes the payment by signing, if necessary, the new register receipt.

BRIEF DESCRIPTION OF THE DRAWINGS

Other objects, features and advantages of the present invention will be apparent from the written description and the drawings in which.

DETAILED DESCRIPTION OF THE EXEMPLARY EMBODIMENTS

Figure 1:
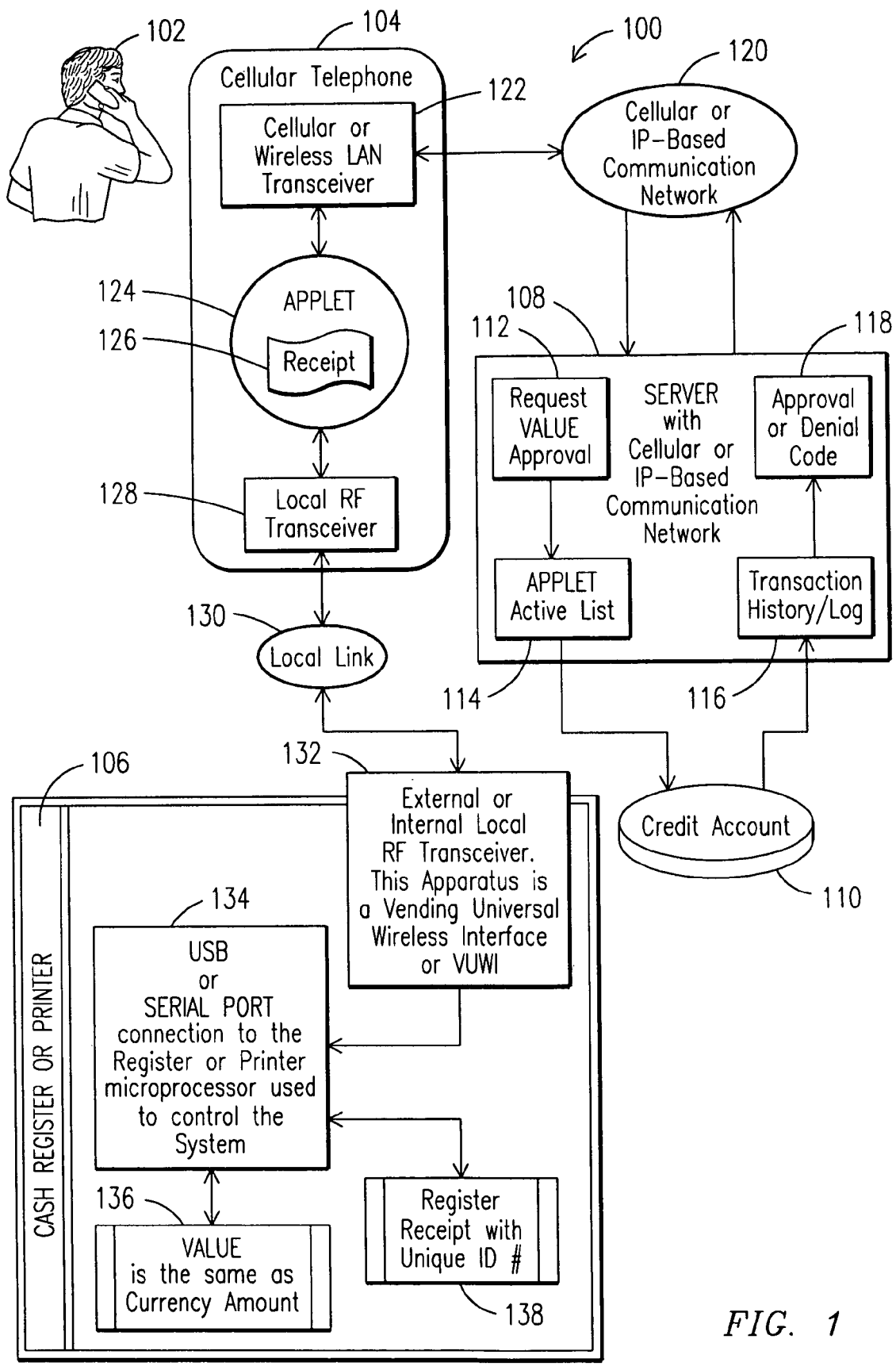
FIG. 1 is a diagram of the present system for establishing currency amount on a Cash Register or by printing a credit/debit card receipt using a cellular telephone.

An exemplary embodiment of the present invention will hereinafter be described with reference to the drawings, in which like numerals indicate like elements throughout the drawing figures.

The present invention is a method and system for establishing a currency value on a Cash Register or Cash Register System, referred to herein as a "register" or "cash register", or having a printer, at a retailer's location, print a credit/debit card receipt for payment of goods and services, by using the consumer's cellular telephone equipped with Bluetooth, Wi-Fi, wireless LAN or other RF communication capabilities. The cellular telephone may be in the form of a cellular telephone, a personal digital assistant (PDA), IPOD, IPHONE, Smartphone, Laptop computer or similar personal wireless communication device, hereinafter collectively called "cellular telephone" or "personal wireless communication device", as a link between the consumer, the register or printer and a server supported credit account. The server is a general purpose digital computer system capable of receiving input from and providing output to a cellular or IP-Based communication network and may be operated by the consumer's telephone company, by the consumer's bank, by the consumer's credit or debit card issuer, by a retail outlet offering credit and/or gift and/or loyalty accounts to the consumer, by a merchant bank or gateway service provider offering credit and/or debit card processing services on behalf of the consumer's telephone company, the consumer's bank, the consumer's credit or debit card issuer, or a retail outlet offering credit and/or gift and/or loyalty accounts to the consumer hereinafter collectively called "server". The server supported credit account may be an account held by the consumer with the consumer's telephone company; with the consumer's bank, with the consumer's credit or debit card issuer; with a retail outlet offering credit and/or gift and/or loyalty accounts to the consumer hereinafter collectively called "credit account". In addition, the credit account can be a mobile wallet supported on the consumer's cellular telephone.

FIG. 1 shows the system 100 of the present invention. System 100 is configured to allow a consumer 102 to load a transaction amount 136 to a cash register or printer 106. For the purposes of this invention, the term "value" means the currency amount available to the consumer 102 through the register or printer 106. System 100 has a cash register or printer 106 having an external or internal Bluetooth, Wi-Fi, wireless LAN or other RF transceiver hereinafter collectively referenced as a Vending Universal Wireless Interface (VUWI) 132 and a cellular telephone 104 associated with a consumer 102 which has a local RF Transceiver 128 and a cellular or wireless LAN transceiver 122, and a remote server 108.

The consumer's cellular telephone 104 is connected to the register or printer 106 via the cellular telephone's local RF transmitter 128, local communication link 130, which is a short range RF communication link, and the VUWI 132 connected to the register or printer 106. The consumer's cellular telephone 104 is also connected to the server 108 via the cellular telephone's cellular or wireless LAN transceiver 122 and the cellular or IP-based communication network 120. The cellular or IP-based communication network 120 allows the consumer 102 to use their cellular telephone 104 to establish a connection with server 108.

When a consumer 102 is ready to pay for products or services provided by a retailer or merchant, three possibilities exist. First, the cash register or printer 106 does not have the ability to accept a currency amount from a cellular telephone 104 and there is no action possible in connection with this invention. Second, the cash register or printer 106 can accept currency amount from a cellular telephone 104 but the consumer 102 does not have the required Applet 124 on their cellular telephone 104. If the consumer 102 decides to download the Applet 124 he follows the following procedure. The consumer 102 calls the telephone number displayed on or near the cash register or printer 106 in order to connect to the server 108. Once the consumer dials the displayed number and the call is received by the server 108, the server 108 makes an automated verbal request through the consumer's cellular telephone 104 for confirmation from the consumer that they wish to download an Applet 124 to be used for making cashless payments. The consumer can respond by pressing a particular key or keys on the keyboard of the cellular telephone 104 or by answering "Yes" verbally over the cellular telephone 104. If the correct key or keys are pressed or the verbal response of "Yes" is provided the server 108, the server downloads the Applet 124 and verbally tells the consumer to follow the activation directions on the display screen of the cellular telephone 104 that will be provided by the Applet 124. Once activated, the consumer 102 can use the Applet 124 for making cashless purchases on a cash register or retailer's printer 106. If the correct key or keys are not pressed or the verbal response of "Yes" is not provided, the server 108 hangs up ending the call.

Third, the register or printer 106 can accept a currency amount from a cellular telephone 104 and the consumer 102 has the required Applet 124 on their cellular telephone 104. If the consumer 102 decides to make a cashless payment at the register or using the retailer's printer 106, the consumer follows the following procedure. The consumer 102 activates the Applet 124 on their cellular telephone 104. The Applet 124 will request that the consumer 102, after reviewing a preliminary copy of the cash register receipt 138, enter the unique receipt number contained thereon and/or the total amount to be spent into the Applet screen using the cellular telephone's keyboard. Then, the Applet 124 using the cellular telephone's local RF Transceiver 128 connects to the cash register or printer VUWI, 132 establishing a two-way communication link 130 between the cellular telephone 104 and the cash register or printer 106 controller. The Applet 124 acquires from the register or printer's microprocessor 134 the cash register or printer 106 identification information and a copy of the cash register receipt 138 identified by the unique cash register receipt number provided by the consumer 102 or the retailer's receipt number series from the printer 106 and transfers this information to the cellular telephone 104 and displays for cash registers 106 the cash register receipt 138 with its receipt number and/or the amount spent or for printers 106 the retailer's ID information, and the retailer's receipt number series plus the amount to be spent on the cellular telephone's display screen. The consumer 102 can then review for cash registers 106 the cash register receipt and the amount to be spent or for printers 106 the retailer's ID information and the amount to be spent on the cellular telephone's 104 display screen. For printers 106 if the Retailer's ID is correct the consumer 102, using the cellular telephone's 104 keyboard enters the base amount and any tip amount to be spent with this retailer and then continues with the next paragraph. For cash registers 106, if the receipt information and amount are acceptable the consumer 102 follows the instructions provided by the Applet 124 on the cellular telephone's display screen and using the cellular telephone's keyboard enters, if appropriate, any tip they wish to have added to the register receipts product or services total.

The Applet 124 will then display the total owed the retailer or merchant for the displayed base amount plus tip and ask the consumer 102 to either accept or reject the total amount shown. If rejected the Applet 124 redisplays the register receipt or retailer's ID and allows the consumer 102 to either cancel the transaction or to re-enter any amount or tip value and continue with the transaction.

If accepted, the Applet 124, using the cellular telephone's 104 cellular or wireless LAN transceiver 122 establishes a two-way communications link using the cellular or IP-based communication network 120 with the server 108. The server 108 uses the two-way communication link to established via the cellular or IP-based communication network 120 data from the Applet 124 along with the identification information of the cellular telephone 104 and the identification information of the register or printer 106 and the tip value added to the register receipt and the total value 136 requested by the consumer 102 in approving the credit for the register or printer 106. The server 108 processes the request for approval 112 of the value 136 requested by the consumer 102 by referencing the consumer 102 server supported credit account 110, which it controls, either directly or indirectly. Once the server 108 has checked for the availability of total value 136 on the consumer's credit account 110 the server 108 generates an approval or denial code 118 and further creates a transaction record 116 as a history or log of the activity which includes the details about the request including the cellular telephone 104 identification information, the consumer's confirmation or identification information such as a personal identification number (PIN), the cash register or printer 106 identification information, the total value 136 to be authorized, the amount of the tip that was added to the cash register receipt, the time and date of the request and finally the approved or denied code.

The approval or denial code 118 is communicated to the consumer 102 via the cellular or IP-based communication network 120 and the consumer's cellular telephone 104. The approval code 118, the tip amount and the total value 136 as approved for use on the register or printer 106 is in-turn transmitted to the register or printer 106 via the cellular telephone's 104 local transmitter 128 using the local link 130 which is received by the register or printer 106 VUWI 132 which in turn informs the register or printer 106 microprocessor controller 134 of the approval code 118, tip amount and the overall total value 136 the consumer 102 has made available to complete the payment process. The cash register or printer's microprocessor controller 134 receives approval code 118, the tip amount and the overall total value 136 and upon request can print a new updated register receipt 138 for the consumer or can print a credit/debit card receipt 139 for the retailer or merchant. The retailer or merchant then presents the new updated register receipt 138 for the consumer or prints the credit/debit card receipt 139 for the retailer or merchant. The retailer or merchant then presents the register receipt to the consumer 102 and if appropriate secures the consumer's 102 signature on the final cash register receipt or on the credit/debit card receipt 139.

It should be noted that in accordance with the system of the present invention, there is no dedicated communication link required between the cash register or printer 106 and the server 108 that authorizes the payment on the cash register or the printing of a credit/debit card receipt 139 by the printer. In addition, the consumer 102 was never required to present or be physically separated from their credit or debit card.

Figure 2B:
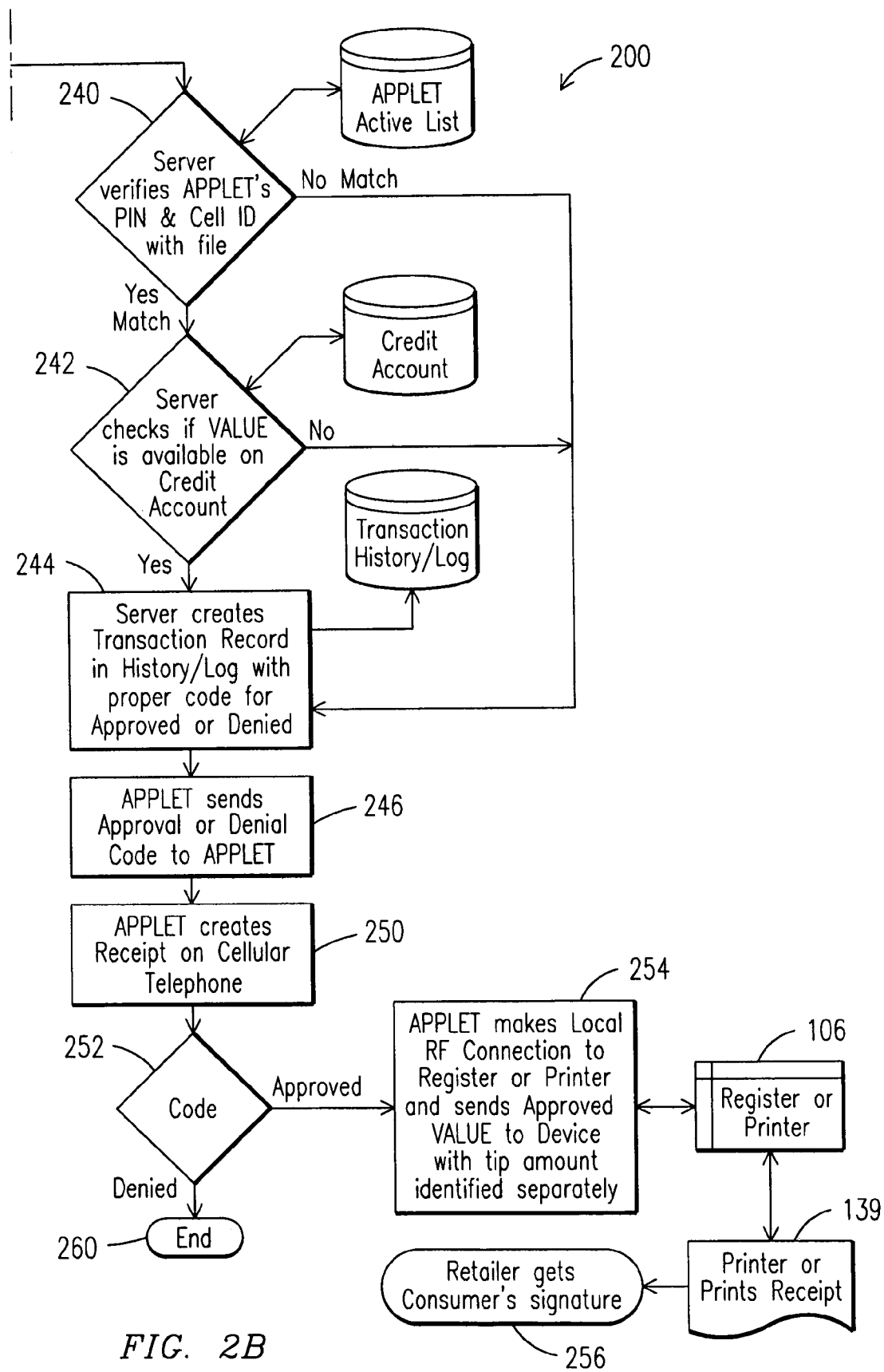
FIG. 2 is a flow chart of the present method of establishing a currency amount on a Cash Register or by printing a credit/debit card receipt using a cellular telephone.

Turning to FIG. 2, a method 200 allows the consumer 102 to establish credit or value 136 on a cash register or printer 106 by using their cellular telephone 104. Using the established credit or value 136, the consumer 102 is able to pay for products or services at any cash register 106 equipped with a VUWI 132. The method 200 begins at step 201 and proceeds to step 202 when the consumer sees a register or printer that accepts a cellular telephone input. At step 202, the consumer 102 sees a register or printer 106 that accepts a cellular telephone 104 input of credits or value 136 as payment for products or services. Information displayed on or adjacent to the register or printer 106 provides instructions for using the consumer's cellular telephone 104 to establish credit on the cash register or by securing a printed credit/debit/card receipt from a printer.

The instructions include a telephone number to call for downloading of an Applet 124 that will run on the consumer's cellular telephone 104 and allow the consumer 102 to establish credit or value 136 on the cash register or printer 106. If the consumer 102 already has the Applet 124 on their cellular telephone 104, the method proceeds to step 220 to where consumer 102 acquires a copy of the cash register receipt 138 containing a unique receipt number and details of their purchase. Otherwise at step 210, the consumer 102 dials the number displayed on the sign to make a telephone connection between the cellular telephone 104 and the server 108 via cellular or IP-based communication network 120. A connection is made with the server 108 at step 212 over the cellular or IP-Based communication network 120. The consumer 102 requests, in step 214, that the server 108 download the Applet 124 to their cellular telephone 104. The server 108 in step 214 makes an entry into its Applet active list 114 and the server 108 in step 218 downloads the Applet 124 to the consumer's cellular telephone 104 and instructs the consumer to follow the instructions displayed on their cellular telephone 104. The Applet in step 219 asks the consumer 102 to input a credit account number, its expiration date and its card verification value (CVV) code, which credit account will be used when paying for products or services at a retailer. The Applet 124 also requests entry of dollar limits to be associated with various types of retailers 106 and a personal identification number (PIN) to be used when using the Applet 124 to pay for products or services at a retailer.

Once the Applet 124 requests have been answered and entered by the consumer 102 on the cellular telephone's keyboard, the Applet 124 contacts the server 108 and uploads the information to the server 108 to store in the Applet active list 114. All of the information entered to the Applet 124 is cleared from and not stored on the cellular telephone 104. If the consumer 102 has the Applet on their cellular telephone 104 the consumer 102 moves to step 220 to begin the payment process.

If the Applet 124 is on the consumer's cellular telephone 104, the consumer 102 then acquires a copy of the cash register receipt 138 from the retailer which receipt contains a unique receipt number in step 220 and then the consumer 102 in step 222 activates the Applet 124 on the cellular telephone. The Applet 124 in step 224 has the consumer 102 enter the unique register receipt number from the cash register receipt 138 and/or the total amount to be spent as shown on the register receipt using the cellular telephone's 104 keyboard and then the Applet 124 in step 226 makes a connection to the cash register or printer 106, equipped with a VUWI 132, using the cellular telephone's local RF transceiver 128 and the local link 130. Once the connection is established between the Applet 124 and the cash register or printer 106 in step 228, the Applet 124 acquires the cash register or printer's identification information and in the case of a cash register, a copy of the register receipt 138 which contains information about the products or services the consumer 102 is about to pay for using their cellular telephone 104. In the case of communication with a printer, the Applet 124 acquires the retailer's receipt number series. The Applet 124 then displays this register receipt with the retailer's ID information, the receipt number and the amount to be spent on the consumer's cellular telephone's 104 display screen and requests in step 230 that the consumer 102 enter their personal identification number (PIN), and a tip amount, if needed, using the cellular telephone's 104 keyboard and then a new receipt total is displayed for the consumer 102. The consumer 102 is asked to accept or reject the new total. If rejected the preliminary transaction is canceled. If accepted, the Applet 124 in step 232 adds the ID of the cellular telephone 104 and continues in step 234 using the cellular telephone's 104 cellular or wireless LAN transceiver 122 to make a connection through the cellular or IP-based communication network 120 with the server 108. Once the connection is established in step 234, the Applet 124 in step 236 transfers the consumer's personal identification number (PIN) and the cellular telephone's identification information and the register's or printer's 106 identification information, along with the tip amount, if any, and the total value 136 requested by the consumer 102 to the server 108 and requests approval for the transaction. The server 108 in step 240 checks to make sure the Applet 124 making the request is coming from the consumer 102 and cellular telephone 104 that the server 108 currently associates with the Applet 124.

The server 108 in step 240 compares the transmitted consumer identification number (PIN) and the cellular telephone's identification information with the data it has stored on its Applet active list 114. If the information matches the server 108, it continues with step 242 to check if the value is available on the consumer's credit account. The server 108 checks in step 242 to see if the value 136 requested by the consumer 102 is available on the consumer's credit account 110. The server 108 then continues with step 244 where it creates a transaction record to be placed in the transaction history log 116. Based on the results of the two tests it made in steps 240 and 242, the server also attaches an Approved or Denied code to the transaction record. The server 108 in step 246 sends an approval or denial code to the Applet 124.

The Applet 124 in step 250 creates a receipt for reference by the consumer 102 on the consumer's cellular telephone 104. The Applet 124 in step 252 checks the Approved or Denied Code sent by the server 108 and if the transaction was denied the Applet 124 displays a request denied message to the consumer 102 on the consumer's cellular telephone's 104 display screen and the transaction is ended.

If the transaction is approved, the Applet 124 in step 254 establishes contact with the cash register or printer 106 using the cellular telephone's local RF transceiver 128 through the local link 130 to establish a connection to the cash register or printer 106 through its VUWI 132 and communicates the tip amount, if any, the Approved or Denied Code 118 and the approved total value 136 to the VUWI 132 which in turn sends the value 136 to the cash register or printer's microprocessor controller 134. The register or printer 106, through its microprocessor controller 134, accepts the payment and provides the retailer with an updated register receipt 138 or if communicating with a printer, prints a credit/debit card receipt 139 which the retailer can provide to the consumer 102 for his signature, if necessary, and then uses the credit/debit card receipt 139 as payment for the products or services.

The credit account 110 used herein and supported by the server 108 may be an account held by the consumer with the consumer's telephone company; with the consumer's bank, with the consumer's credit or debit card issuer; with a retail outlet offering credit and/or gift and/or loyalty accounts to the consumer or be credit held as part of a mobile wallet on the consumer's cellular telephone.

Figure 3:
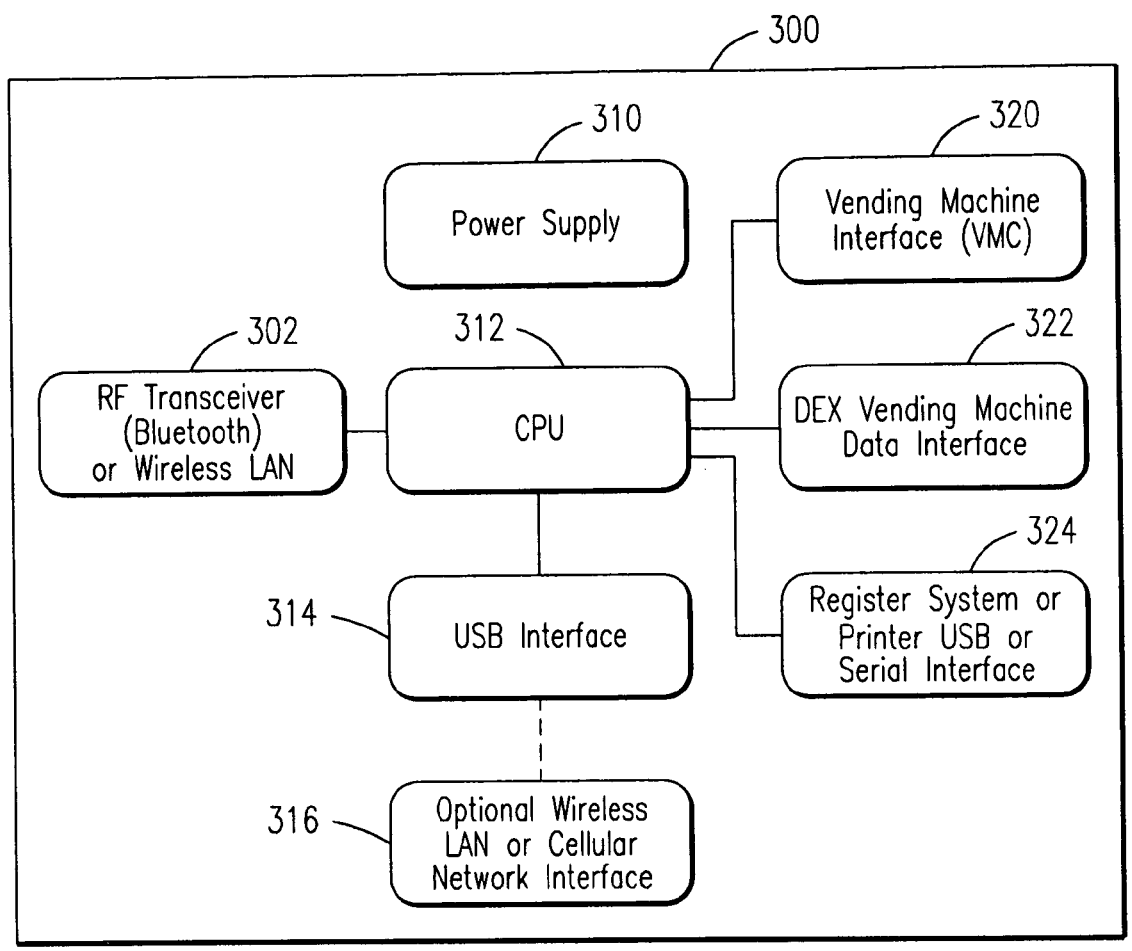
FIG. 3 is a block diagram of the Vending Universal Wireless Interface (VUWI) that is attached to a Cash Register or to a printer that allows the establishing of a currency amount on the Cash Register or by printing a credit/debit card receipt using a cellular telephone.

FIG. 3 is a block diagram of the vending universal wireless interface (VUWI) 300 of the present invention. The VUWI 300 is designed to allow a consumer's cellular telephone 104 to communicate locally with a cash register or printer 106. The VUWI 300, also referenced as VUWI 132 in the system 100, provides an interface between the cellular telephone 104 and the cash register or printer 106 microprocessor controller 134 to transfer value 136.

The VUWI 300 consists of several subsections controlled by the CPU 312. The transceiver 302 provides the local link 130 to the cellular telephone 104 for customer interface and optionally WAN access 120 to the server 108. The power supply 310 can either modify the power supplied by the cash register or printer 106 or can be an external power supply or an A/C Adaptor for the VUWI 300. A USB Interface 314 allows the plug-in and removal optional WAN to access devices such as an optional WAN Link 316 to provide direct reporting of the VUWI 300 status. The (VMC) Vending Machine Interface 320 enables the CPU 312 to transfer the value 136 to the controller 134. The DEX vending machine data interface 322 provides optional data collection of vending device status information. The register system or printer USB or Serial Interface 324 enables the CPU 312 to transfer the value 136 to the microprocessor controller 134 of any register or printer 106.

Normal operation of vending universal wireless interface (VUWI) 300 is as follows. The cash register or printer 106 or an external power supply or an A/C Adaptor provides power to the Power Supply 310 that in turn will provide power to all other components of VUWI 300. The CPU 312 will initialize the transceiver 302, USB interface 314, vending machine interface 320 and any optional interfaces attached such as optional WAN link 316 and the DEX vending machine data interface 322. The CPU 312 sets the transceiver 302 to make itself available to establish connections to cellular telephones 104. A customer 102 establishes a connection with transceiver 302 through a cellular telephone 104 by activating the Applet 124. The CPU 312 provides machine identification information to the Applet 124 running on the cellular telephone 104 over the transceiver 302 and the local link 130. Optionally the CPU 312 can also provide data collected by DEX vending machine data interface 322 to the Applet 124 running on the cellular telephone 104 by transceiver 302 and the local link 130. The Applet 124 requests, on the cellular telephone's display screen, that the consumer enter value 136 to be spent on the register or printer 106 using the cellular telephone's 104 keyboard. The Applet 124 then sends a request for approval along with all other data details to the server 108 for authorization over the cellular telephone's 104 cellular or wireless LAN transceiver 122 over the cellular or IP-based communications network 120. The server 108 then processes the request and responds to the Applet 124 running on the cellular telephone 104. If the Applet 124 detects that the request was approved it will communicate the approved value 136 to the register or printer 106 over the cellular telephone's local RF transceiver 128 through the local link 130 to the register or printer's transceiver 302, which will in turn transfer the value 136 to the CPU 312. The CPU 312 transfers the value 136 to the register's microprocessor controller 134 using the register system interface 324. The microprocessor 134 will then handle the payment by the consumer 102 as if the consumer 102 had actually swiped a credit/debit card to make the payment.

The system 100 and method 200 using the VUWI 300 of the present invention allows the consumer 102 to establish a currency amount on a cash register or printer 106 in order to pay for products or services without using currency or a credit card but by only using a cellular telephone 104 which through the VUWI 300 is able to communicate with the cash register or printer 106. Thus, the system 100 and method 200 using the VUWI 300 of the present invention eliminates the need for in pocket currency or for a dedicated communication link between the cash register or printer 106 and a credit account 110.

It should be clear at this time that the present invention eliminates the need for in pocket currency or in hand credit/debit cards for paying for purchases at a cash register and also eliminates the need for a dedicated online or dial up connection between the register or register and a server supported credit account by using a consumer's personal communication device equipped with RF communication capability. In addition, the consumer is not required to relinquish control over their credit/debit card thus elimination the possibility of fraudulent use of the credit/debit card or its information while out of the hands of the consumer or in the hands of a third party. The process can be implemented by the addition of Vending Universal Wireless Interface (VUWI) to a cash register or printer microprocessor using a USB or serial port and with the addition of an Applet to an existing cellular phone or the like. However the present invention is not to be construed as limited to the forms shown which are to be considered illustrative rather than restrictive.

I claim:

1. A method of executing a transaction on a cash register or printer by a consumer comprising:
   selecting a cash register or printer having a microprocessor controller therein and having a Vending Universal Wireless Interface (VUWI) coupled thereto;
   activating an applet on a personal wireless communication device to establish a wireless two-way link with said cash register or printer coupled VUWI;
   communicating between said personal wireless communication device and said VUWI to acquire information therefrom;
   establishing a wireless link between said personal wireless communication device and a remote computer server;
   transmitting information acquired from said cash register or printer by said personal wireless communication device to said remote computer server along with a request for credit approval for a transaction;
   transmitting a credit approval response from said remote computer server to said personal communication device for a transaction when such credit is approved;
   transmitting said credit approval from said personal wireless communication device to said cash register or printer VUWI; and
   activating said cash register or printer to pay for a product or service;
   thereby eliminating the need to use currency, or to surrender one's credit card to a third party, or for a dedicated connection between a cash register and a remote computer server in making a credit payment on a cash register or printer.

2. The method of executing a transaction on a cash register or printer by a consumer in accordance with claim 1 in which the selected cash register or printer coupled VUWI is coupled through the cash register or printer USB port.

3. The method of executing a transaction on a cash register or printer by a consumer in accordance with claim 1 in which the selected cash register or printer coupled VUWI is coupled through the cash register or printer serial port.

4. The method of executing a transaction on a cash register or printer by a consumer in accordance with claim 1 including the step of downloading the applet on a users personal wireless communication device prior to activating said applet.

5. The method of executing a transaction on a cash register by a consumer in accordance with claim 4 including the step of acquiring an amount owed for a register receipt from said cash register by said personal wireless communication device for transmission to said remote computer server.

6. The method of executing a transaction on a cash register or printer by a consumer in accordance with claim 4 including the step of acquiring the users cellular telephone identification by said applet for transmission to said remote computer server.

7. The method of executing a transaction on a cash register or printer by a consumer in accordance with claim 6 including the step of dialing a posted telephone number for downloading said applet.

8. The method of executing a transaction on a cash register or printer by a consumer in accordance with claim 7 including the step of said remote server verifying said personal wireless communication device identification and personal identification information upon receipt of a request from said personal wireless communication device.

9. The method of executing a transaction on a cash register or printer by a consumer in accordance with claim 8 including the step of said remote computer server generating an approval or denial response to said personal wireless communication device.

10. A system for executing a transaction on a cash register or printer by a consumer using the consumer's personal wireless communication device comprising:
    a cash register or printer having a vending universal wireless interface (VUWI) coupled to said cash register or printer microprocessor controller;
    a personal wireless communication device having a local transceiver and having an applet thereon for communication between said personal wireless communication device and said vending universal wireless interface; and
    a remote computer server linkable with said personal wireless communication device for receiving requests from said personal wireless communication device for approval of a transaction on said cash register or printer, said remote computer server being adapted to respond to approval for credit to complete a transaction.

11. The system for executing a transaction on a cash register by a consumer using the consumer's personal wireless communication device in accordance with claim 10 in which said vending universal wireless interface is coupled to said cash register or printer USB port.

12. The system for executing a transaction on a cash register by a consumer using the consumer's personal wireless communication device in accordance with claim 10 in which said vending universal wireless interface is coupled to said cash register or printer serial port.

13. The system for executing a transaction on a cash register by a consumer using the consumer's personal wireless communication device in accordance with claim 10 in which said personal communication device is a cellular telephone.

14. The system for executing a transaction on a cash register by a consumer using the consumer's personal wireless communication device in accordance with claim 10 in which said vending universal wireless interface includes an RF transceiver.

15. The system for executing a transaction on a cash register by a consumer using the consumer's personal wireless communication device in accordance with claim 10 in which personal wireless communication device applet includes means for setting up a communication link with said vending universal wireless Interface and acquiring cash register identification information therefrom.

16. The system for executing a transaction on a cash register by a consumer using the consumer's personal wireless communication device in accordance with claim 15 in which said cash register is a cash register for accepting payments for products or services rendered.

17. A method of executing a transaction on a printer by a consumer comprising:
    coupling a Vending Universal Wireless Interface (VUWI) to a printer microprocessor controller;
    activating an applet on a personal wireless communication device to establish a wireless two-way link with said printer coupled VUWI;
    communicating between said personal wireless communication device and said VUWI to acquire information from said printer;
    establishing a wireless link between said personal wireless communication device and a remote computer server;

transmitting information acquired from said printer by said personal wireless communication device to said remote computer server along with a request for credit approval for a transaction;
transmitting a response from said remote computer server to said personal communication device authorizing a predetermined credit approval for a transaction when such credit is authorized;
transmitting said credit approval from said personal wireless communication device to said printer VUWI; and
activating said printer to print a credit/debit card receipt.

\* \* \* \* \*